United States Patent [19]

Horwitz

[11] 4,099,694
[45] Jul. 11, 1978

[54] SWIVEL HOOK ASSEMBLY

[75] Inventor: Howard James Horwitz, Hidden Hills, Calif.

[73] Assignee: Spencer G. Horwitz, Tarzana, Calif.; a part interest

[21] Appl. No.: 736,764

[22] Filed: Oct. 29, 1976

[51] Int. Cl.² ............................................. F16B 45/00
[52] U.S. Cl. ................................... 248/339; 248/290; 248/306
[58] Field of Search .................... 248/289, 290, 222.1, 248/223.4, 224.4, 225.1, 225.2, 301, 303–307, 339–344, 215, 323, 324; 403/165, 316, 319, 353, 354

[56] References Cited

U.S. PATENT DOCUMENTS

| | | | |
|---|---|---|---|
| 860,762 | 7/1907 | McGrady | 248/339 |
| 1,197,052 | 9/1916 | Newhall | 248/343 X |
| 1,340,014 | 5/1920 | Claflin | 248/305 X |
| 1,628,860 | 5/1927 | Steinkraus | 248/307 |
| 1,882,312 | 10/1932 | Aspinwall | 248/343 |
| 2,672,230 | 3/1954 | Jetzke | 248/341 X |
| 2,683,612 | 7/1954 | Bacino | 248/223.4 X |
| 2,999,125 | 9/1961 | Young | 403/316 X |
| 3,139,260 | 6/1964 | Hamel | 248/340 |
| 3,955,441 | 5/1976 | Johnson | 403/316 X |
| 3,995,822 | 12/1976 | Einhorn et al. | 248/304 |

FOREIGN PATENT DOCUMENTS

| | | | |
|---|---|---|---|
| 363,483 | 8/1906 | France | 248/307 |
| 343,397 | 11/1921 | Fed. Rep. of Germany | 248/304 |
| 1,131,598 | 6/1962 | Fed. Rep. of Germany | 248/339 |

*Primary Examiner*—Lawrence J. Staab
*Attorney, Agent, or Firm*—John J. Posta, Jr.

[57] ABSTRACT

The improved swivel hook assembly of the invention features fixed mounting of a housing portion to a ceiling or other extended surface area, as by a screw assembly or the like, and releasable mounting of a hook portion to the housing for rotation therein. The hook portion can be connected to and rotated in the housing so as to adjustably position an article when connected to the hook portion. Means may be provided for engaging and disengaging the hook portion and housing while the hook portion is in the housing so as to prevent or permit free rotation of the hook relative to the housing.

The hook may be divided into a plurality of segments spring biased towards each other into an openable closed loop to releasably secure an article on the hook. Limit means may also be provided on the hook and a push-pull handle may be provided on a closure for releasably sealing the hook in the housing. The assembly thus has improved utility and convenience.

9 Claims, 7 Drawing Figures

SWIVEL HOOK ASSEMBLY

BACKGROUND OF THE INVENTION

1. Field of the Invention

The present invention generally relates to support means and more particularly to a swivel hook assembly of improved construction.

2. Prior Art

The usual type of hook for hanging an item such as a chandelier, lamp or the like from the ceiling or for use as a clothes hook or the like comprises a hook portion fixedly connected to a pointed screw. The screw is screwed into the support surface ceiling or wall until the hook abuts such surface, whereupon the hook is, for all intents and purposes, permanently fixedly mounted in place.

In one variation of the described device, the screw portion passes through a decorative collar which is held in place by the abutting hook. Again, the hook is mounted in a fixed non-rotating location.

In a third version, a bracket is first fixed to the ceiling or wall. The hook is then threaded into the bracket until it is locked in place.

All three versions feature a hook which ultimately is fixed in place and is not intended to be removed. If it is desired to partially rotate the hook, this is accomplished by sacrificing a tight secure connection between the hook and ceiling or wall, or between the hook and the collar or bracket, in each instance an undesirable situation from the standpoint of safety and appearance. Such devices are for all intents and purposes rigid permanent mountings best carried out by first permanently installing the hook in a fixed location and then hanging the desired item therefrom. Obviously, such devices do not provide flexibility to easily reposition or remove the hook when in place or to use it as a convenient carrier means for an item attached to it before its installation into a wall or ceiling. Such flexibility would be a substantial improvement, particularly if incorporated into a simple, inexpensive, adaptable device.

SUMMARY OF THE INVENTION

The present invention satisfies the foregoing needs. Thus, it comprises an improved swivel hook assembly substantially as described in the Abstract above. The assembly comprises a housing to be fixedly mounted, as by a threaded connector, to a ceiling or wall. The housing includes an internal chamber, a configured entry port leading thereto and a removable plug or closure for the port.

The assembly further includes a swivel hook having a hanger portion configured to pass through the port for rotation in the housing chamber, and a hook portion fixedly connected to the hanger portion and depending therefrom outside the housing. The hook portion may include segments releasably spring biased into contact with each other to provide a closed loop openable to an extent controlled by associated limit means.

The hanger and/or chamber may include releasably engageable step means such as toothed surfaces to releasably prevent rotation of the hanger in the housing chamber.

With this assembly it is possible to first mount the housing to a ceiling or wall and rotatably mount the hook in the housing, before or after engaging the hook with an item such as clothing, a lamp, a chandelier, etc. to be supported by the hook. The assembly can assure that the supported item can be locked safely in place, yet can be easily moved or removed, with or without the hook, and also can be rotated as often as wanted to any desired position. Thus, the improved device provides full flexibility and improved utility, yet is simple, inexpensive and durable. Other features are set forth in the following detailed description and accompanying drawings.

DRAWINGS

DETAILED DESCRIPTION

FIGS. 1-4

Figure 1:
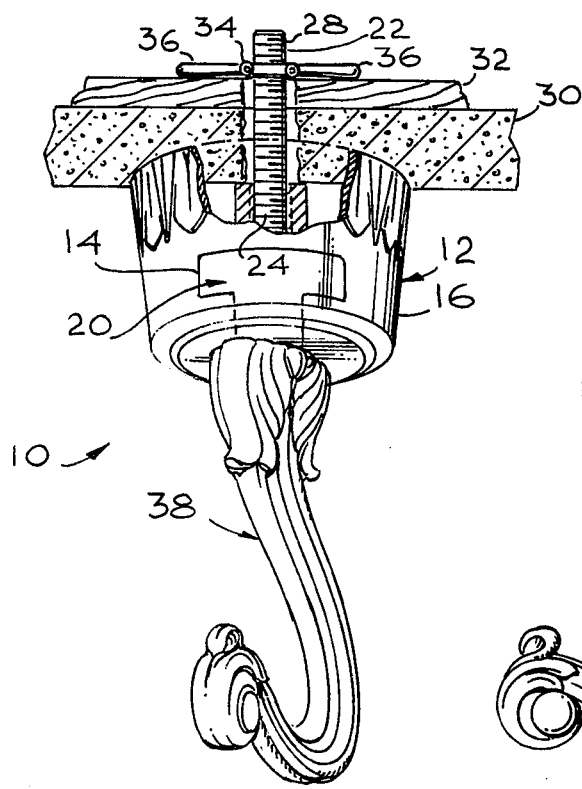
FIG. 1 is a schematic perspective view, partly broken away, of a first preferred embodiment of the improved swivel hook assembly of the present invention in place in a ceiling.
Figure 2:
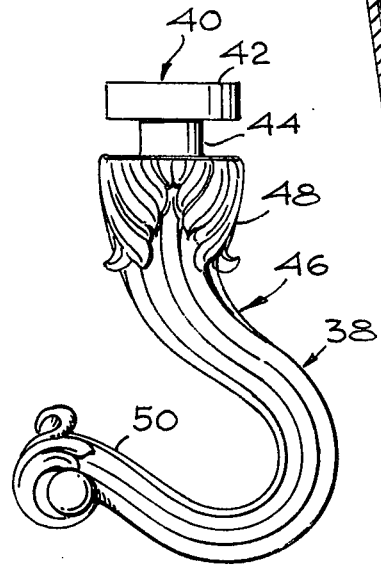
FIG. 2 is a schematic side elevation of the hook portion of the assembly of FIG. 1.
Figure 4:
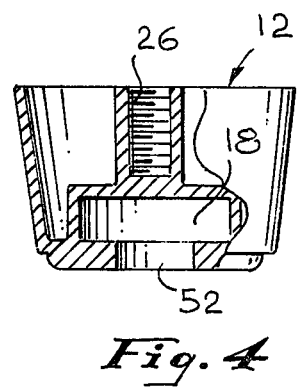
FIG. 4 is a schematic side elevation, partly broken away, of the housing of FIG. 1.

A first preferred embodiment of the improved swivel hook assembly of the invention is schematically depicted in FIGS. 1-4. Thus, FIG. 1 shows an assembly 10 comprising a hollow housing 12, having a configured entry port 14 extending from the outer surface 16 of the side of housing 12 to a chamber 18 in housing 12, and releasably closed by a removable closure plug 20.

Figure 3:
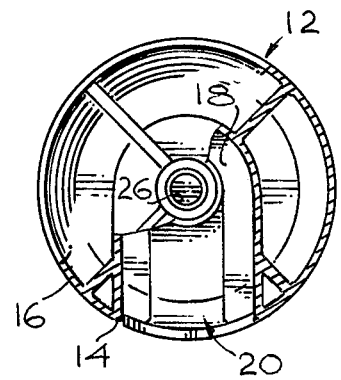
FIG. 3 is a schematic top plan view, partly broken away, of the housing portion of the improved assembly of FIG. 1.

Housing 12 also includes mounting means in the form of a threaded support screw 22 engaged at its lower end 24 in a threaded channel 26 in the upper central portion of housing 12 and with its upper end 28 extending through a ceiling 30 and lathe 32 (FIGS. 1 and 3). End 28 may carry a support collar 34 with hinged support legs 36 or the like, as shown in FIG. 1, to help brace screw 22 in a weight supporting position.

Housing 12, as shown in FIG. 1, can be screwed up tightly and immovably against ceiling 30. However, assembly 10 also includes a swivel hook 38 which freely rotates in chamber 18 (FIG. 4) and is releasably held therein against removal therefrom by plug 20. Hook 38 comprises an upper hanger portion 40 (FIG. 2) having a broad horizontally extending top 42 and a narrow shank 44 rigidly connecting hanger 40 with hook portion 46 depending therefrom. Hook portion 46 includes a main body 48 and an integral arcuate hook 50 therebelow.

It should be noted that top 42 and shank 44 conform to but are slightly smaller than the configuration of entry port 14, chamber 18 and plug 20. Shank 44 extends down through a central bottom opening 52 (FIG. 4) in chamber 18 so that hook 38 can freely rotate relative to housing 12, as previously described.

Thus, assembly 10 is simple, can be made of inexpensive materials such as cast metal, or plastic, ceramic, wood or the like, and is durable and easy to install and use. Hook 38 can be added to and removed from housing 12 at will and can be freely rotated therein.

Housing 12 can, for example, be installed first, and then hook 38 can be used to lift, for example, a lamp or the like (not shown) and support it in place by passing hook 38 into chamber 18 and then fitting plug 20 in place. Such lamp (not shown) can then be rotated by hook 38 to the desired location to provide the finished installation with a maximum of speed, adaptability and safety. Such lamp can be rotated to another at any time without disassembling the components of assembly 10.

FIG. 5

Figure 5:
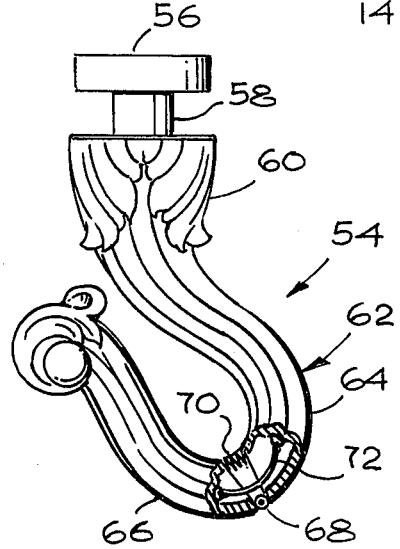
FIG. 5 is a schematic side elevation, partly broken away, of a modified version of the hook portion of FIG. 2.

In order to assure that an item supported on the hook of the present assembly 10 will not be inadvertently separated therefrom, the hook of assembly 10 can be modified to the form shown schematically in FIG. 5. In FIG. 5 a hook 54 is shown which can substitute for hook 38 in assembly 10.

Hook 54 includes a top 56, shank 58 and body 60 identical to top 42, shank 44 and body 48. However, hook 54 also includes a portion 62 which, while of the same general configuration as portion 50, comprises, unlike portions 50, two hollow segments 64 and 66 hinged together, as at 68, biased together by spring 70 into a closed loop and openable to an extent controlled by a flexible limit strap 72, ends of which are secured to segments 64 and 66, as shown in FIG. 5. Hook 54 thus can hold an item more safely and without inconvenience and so has substantial advantages over hook 38.

FIG. 6

Figure 6:
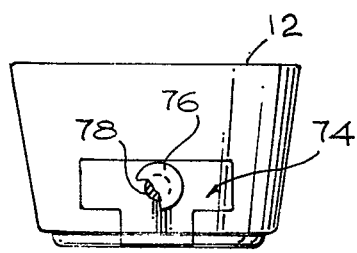
FIG. 6 is a schematic perspective view, partly broken away, of a modified version of the closure of FIG. 1; and, FIG. 7 is a schematic side elevation, partly broken away, of a modified version of the chamber and hook portions of the assembly of FIG. 1.

A modified version of plug 20 of assembly 10 is shown schematically in FIG. 6. Thus, a plug 74 generally comparable to plug 20 is shown inserted in housing 12. However, plug 74 also has an added feature. Thus, it bears a push-pull handle or knob 76 extending outwardly thereof and connected thereto by a shank 78 to facilitate easy and rapid insertion of plug 74 into and removal of plug 74 from port 14 at any time. With this arrangement, hook 38 can be removed and inserted at will.

FIG. 7

Figure 7:
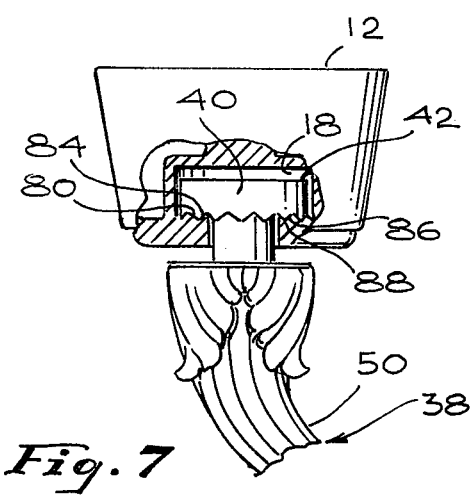

Another modification of the improved assembly of the present invention is schematically depicted in FIG. 7. Thus, housing 12 is modified to the extent that the bottom wall 80 of chamer 18 bears a roughened area on its upper surface 82, preferably a plurality of serrated teeth 84 or the like.

The bottom surface 86 of top 42 of hanger 40 is also modified so as to bear a roughened area, such as serrated teeth 88. Teeth 84 are adapted to releasably engage 88 to prevent rotation of hanger 40 in chamber 18, that is, swiveling of hook 50. Gravity, with or without a weight attached to hook 50, will prevent this rotation unless hook 38 is pushed up to disengage teeth 84 and 88 and while these teeth are so disengaged, hook 38 is rotated a desired degree. Reengagement of teeth 84 and 88 can then be permitted merely by releasing hook 38.

This releasable lock thus provides for easy simple desirable rigid positioning of hook 50, yet also permits swiveling thereof as desired, for maximum utility. Depending on the configuration employed, the same releasable locking mechanism relative to top 42 and chamber 18 could be achieved using a roughened on only one of top 42 and chamber 18. However, the dual roughened areas described are preferred.

Thus, the improved swivel hook assembly of the invention is compact, decorative, easy to install, simple and inexpensive, and it has improved utility over conventional swivel hooks, all as set forth above.

It will be understood that various other modifications, changes, alterations and additions can be made in the improved assembly of the present invention and in its components and their parameters, in order to achieve the advantages as hereinbefore described. All such modifications, changes, alterations and additions as are within the scope of the appended claims form part of the present invention.

What is claimed is:

1. An improved swivel hook assembly, said assembly comprising, in combination:
   a. a housing having
      1. a configured entry port extending into the interior thereof and adapted to receive a swivel hook hanger, and
      2. mounting means for fixedly mounting said housing to an extended support surface;
   b. a swivel hook having an arcuate lower article-supporting hook portion and an upper configured hook hanger adapted to pass through said entry port, said upper hanger being releasably rotatably contained in a fixed location within said housing, said hook being releasably securable against rotation; and,
   c. a closure removably received in said entry port and being movable radially relative to the axis of rotation of said swivel hook into and out of port-closing position.

2. The improved assembly of claim 1 wherein said assembly is adapted for connection to a ceiling, and wherein said entry port extends through a side of said housing and into communication with a chamber therein adapted to snugly rotatably receive said hook hanger.

3. The improved assembly of claim 2 wherein said mounting comprises a threaded support insertable in said ceiling so as to depend therefrom and a threaded channel in said housing adapted to releasably receive said threaded support when depending from said ceiling, wherein said housing is substantially cylindrical.

4. The improved assembly of claim 2 wherein said arcuate hook portion includes a first segment releasably biased against a second segment to provide an openable, normally closed weight-supportable loop, said loop being openable only at its upper end and being weight supportable even when open.

5. The improved assembly of claim 4 wherein said first segment is spring biased into contact with said second segment and wherein limit means are provided in said two segments so that said two segments are only partially openable into a hook configuration.

6. The improved assembly of claim 2 wherein said removable closure includes on an exterior side surface thereof a push-pull means to facilitate insertion and removal of said closure relative to said entry port.

7. The improved assembly of claim 2 wherein at least one of said hanger and said chamber includes releasable stop means for releasably preventing rotation of said hanger in said chamber.

8. The improved assembly of claim 7 wherein said hanger is fixedly connected to said hook portion and wherein said chamber and said hanger include roughened mutually engageable surfaces comprising said stop means.

9. The improved assembly of claim 8 wherein said stop means comprise teeth on the lower surface of said hanger and on the upper surface of the bottom portion defining said chamber, whereby upon movement of said hanger disengages said teeth for free rotation of said swivel hook.

* * * * *